(12) United States Patent
Tandio et al.

(10) Patent No.: US 9,617,397 B2
(45) Date of Patent: Apr. 11, 2017

(54) PLASTIC REAGENT AND PROCESS

(71) Applicants: Sugianto Tandio, Jakarta (ID); Eman Suryana, Serang-Banten (ID); Jon Mogck, Rosemount, MN (US); David Melander, St. Louis Park, MN (US)

(72) Inventors: Sugianto Tandio, Jakarta (ID); Eman Suryana, Serang-Banten (ID); Jon Mogck, Rosemount, MN (US); David Melander, St. Louis Park, MN (US)

( * ) Notice: Subject to any disclaimer, the term of this patent is extended or adjusted under 35 U.S.C. 154(b) by 0 days.

(21) Appl. No.: 14/647,280

(22) PCT Filed: Nov. 25, 2013

(86) PCT No.: PCT/US2013/071754
§ 371 (c)(1),
(2) Date: May 26, 2015

(87) PCT Pub. No.: WO2014/082049
PCT Pub. Date: May 30, 2014

(65) Prior Publication Data
US 2015/0299403 A1     Oct. 22, 2015

Related U.S. Application Data

(60) Provisional application No. 61/796,914, filed on Nov. 26, 2012.

(51) Int. Cl.
*C08J 3/22*     (2006.01)
*C08J 5/18*     (2006.01)

(52) U.S. Cl.
CPC ............... *C08J 3/22* (2013.01); *C08J 3/226* (2013.01); *C08J 5/18* (2013.01); *C08J 2300/00* (2013.01)

(58) Field of Classification Search
CPC .................................. C08J 3/22; C08J 3/226
USPC ................................ 523/124, 125, 126, 351
See application file for complete search history.

(56) References Cited

U.S. PATENT DOCUMENTS

2009/0149606 A1*   6/2009   Meissner ............... C08L 23/02
                                                                                  525/240

* cited by examiner

*Primary Examiner* — Edward Cain
(74) *Attorney, Agent, or Firm* — Advantage IP Law Firm

(57) ABSTRACT

Methods for improving the degradability of synthetic resins and/or synthetic resin mixtures and reducing the toxicity associated with the degradation process are disclosed herein with one such method involving the determination of a desired product lifespan and based on such lifespan, producing a mixture of a compatible degradation salt with a first compatible resin based on an algorithm, pre-mixing the compatible degradation inducing salt with the first synthetic resin to create a pre-mixed batch, and adding the pre-mixed batch to a second synthetic resin to create a master batch from which products may be manufactured with a known degradation timeline.

14 Claims, 2 Drawing Sheets

PLASTIC REAGENT AND PROCESS

CROSS REFERENCE TO RELATED APPLICATIONS

This application is a U.S. National Stage application of International Application No. PCT/US2013/071754, filed on Nov. 25, 2013, which claims the benefit of Application No. 61/796,914, filed on Nov. 26, 2012, and titled Plastic Reagent and Process, and which are hereby incorporated by reference in their entireties.

BACKGROUND

1. Field of the Invention

The present invention relates generally to reagents, additives, resin blends and the like, that promote degradability in plastics, and more specifically it relates to a reagent that controllably initiates degradability in a specific time frame and reduces toxicity commonly associated with degradable reagents and the like.

2. Background Art

It is clear and apparent that degradable plastic products are becoming more and more in demand with the considerable environmental concerns and public demands of society. As outlined in my co-pending patent application entitled Starch Based Reactor, Resultant Products, and Methods and Processes Thereof, plastic waste is not only filling up landfills at an alarming rate, but is frequently finding a final graveyard in several swirling pockets in the oceans, some considered of major proportions. The quest to find a solution to deal with plastic waste depends on the particular plastic being used and the type of product being manufactured. For example, disposable products such as merchandise bags or disposable plates and containers used in fast food restaurants would tend to require a degradation rate much faster than other plastic products such as toys, office products, home decorations and so on. It is easy to understand that different degradable solutions are needed for the various types of products, depending on the desired rate of degradation.

One approach to making a plastic product degrade at a more rapid rate is the application of blending a degradable reagent into polyethylene and other plastic resins in order to cause them to degrade or biodegrade as the case may be. Some of these plastic products may also be compostable. Starch based resins are also commonly used with certain products and provide excellent compostability, but tend to create low strength films, have poor clarity, and are usually used in applications where recycling is not considered necessary. Due to poor strength issues, films must be substantially thicker, thus the costs are relatively high compared to standard resins, and not considered viable for mass market products. Thus mass market film and container products are manufactured from more inexpensive light gauge films, typically made from virgin ethylene-based resins. For example, bag products may be as thin as 0.0005 gauge, which is not possible to manufacture such a thin gauge with starch based resins.

Another approach to degradable resins involves the use of synthetic aliphatic polyesters Polycaprolactones (PCL) and their associated blends. They tend to provide good compostability, but likewise, strength properties are poor, their cost is high, and recycling is not desirable. Polyhydroalkanoates (PHA) and the related PHB and PHBV provide good compostability, but share the same high cost, inability to be recycled, are difficult to process, and have an unpleasant odor. Its use is primarily limited to certain types of bottles and medical applications. Another aliphatic synthetic polyester is PLA, which has good transparency qualities, is referred to as being "biocompatible" (a somewhat nebulous term depending on a company's definition) but shares the same high cost, poor processability, with a generally more rigid resultant product and is not considered desirable to recyclable. Thus, these types of degradable resins have limited market appeal.

The more popular form of degradable reagent used today are the oxodegradables, which are typically a form of salt that promotes degradability in a plastic by accelerating oxidation of the polymers. Oxygen naturally wants to break down molecular chains, but due to the long molecular chains it takes about 1000 years to break down ethylene-based polymers. Oxodegradables may reduce that time frame down to a few years or even a few months. These prior art reagents consist of a calcium salt, which when added to standard polyethylene (or other plastic resin types) will cause a reaction with the plastic composition that creates an oxygen mass that breaks down the long molecular chains, providing shorter degradable molecules which bio-organisms may consume. This is accomplished through oxidation of the smaller molecules, which transforms for example, a hydrophobic plastic film into hydrophilic film. The result is a bio assimilation film that degrades rapidly. Products made from this type of master batch may degrade at a more rapid rate. These types of reagents are added to polyethylene resins and the like, in relatively small concentrations, whereas the reagent tends to migrate throughout the plastic material when buried, such as in a landfill, and degrade in a relatively short time frame. For example, typical plastic made with an ethylene feedstock will thus degrade in 1000 years in the ground. In comparison those with an oxodegradable additive may degrade in a several months or a few years.

Typical oxodegradables using cadmium salt include those made by Willow Ridge, EPI®, and Symphony Plastics (D2W™). As the case may be, these additives tend to have lower costs than products made with the synthetic aliphatic and starch resins and tend to have superior strength qualities especially when used in products requiring higher strength, such as film. They also tend to be easier to process, and reportedly degrade as litter (in the air) and in the soil, such as in a landfill, and in water if accidently disposed. However, they are slow to compost, i.e. it may take up to 8-10 months or a few years. The cost of these reagents is in generally the $3.20 to $5.00 per pound range.

Reportedly, prior art oxodegradables may be used for a variety of plastics to promote degradability. However, it hasn't been widely applied outside of film products and very little actual testing and verification of degradability results has been performed. The primary reason for the inadequate, unreliable testing is due to the many variables associated with the manufacture of the products using cadmium based salt additives. This conundrum is verified by a report from the United Kingdom government. The 2010 UK government DEFRA report on oxo-biodegradable plastics (OBP) concluded that OBP claims made by one supplier, EPI, were inaccurate and misleading. It was further supported by a leading UK retailer, Tesco, that stopped using and specifying OBP bags due to manufacturing problems, such as trying to maintain bubble stability of the extruded film used in its products.

With the cadmium salt based oxodegradable reagents, degradation may be as fast as 12 to 36 months based on the desired degradation rate of a product, and thus it depends on a specific amount of additive to be used. At times, it takes a longer period of time to degrade if the amount of oxodegradable reagent blended in the resin fails to achieve necessary ratios. This is all due to the fact that control over the percentage added to the resin may vary from batch to batch and even from day to day. The conditions causing these variables in the degradation time frame include: inconsistent blending methodologies; inconsistent monitoring of the injection of additives in the resins; the reduction of the amount of additive blended into the resin batch in order to reduce raw material costs, and suppliers' inability to assess the amount of additive needed to achieve intended degradation times.

Due to the difficulties of properly blending and applying the prior art oxodegradable additives, which is typically blended at a 1%-2% rate, the ultimate degradable outcome tends to be unpredictable. Products made from the master batched resins may contain portions that degrade in a few years, yet other portions may literally take decades or centuries to degrade. Thus, much of the outcome is based on guesswork.

In order for the cadmium salt based additives to be effective, they must be consistently blended throughout the master batch, monitored throughout, and accurately verified that the correct percentages are being used. It is difficult enough to control adding a small percentage of additive let alone ensure that it has produced an amalgamous master batch. Perhaps one of the most compelling factors in the use, or "inadequate use" as the case may be, of the oxodegradable additives, is the cost. Since it costs up to five times more than the resin itself, it adds substantially to the cost of the product being manufactured. This creates a generally unsatisfactory situation, in particular when attempting to maintain competitive pricing. For example, one supplier may have a fairly significant cost advantage over another supplier by reducing the amount of additive used from 2% down to 1% or even 1.5%. Likewise, the potential harm this does when the products hit the landfill, a river, or ocean, becomes detrimental to the environment.

Another approach to satisfying the demands of industry to use degradable resins is the use of a starch based resin as disclosed in my co-pending patent application. For example, products made from the Tapioca based resins will in fact degrade in their entirety in a matter of months, or years in some far reaching scenarios. While this may be an excellent solution in many cases and is competitive cost-wise, the resins are not capable of being used in certain products, such as very thin films or those that may require exceptional strength qualities.

An additive that overcomes the numerous problems associated with prior art degradable reagents and additives would be valuable to these trades and many others.

SUMMARY

The reagent of the present invention overcomes the problems associated with prior art. The low cost alternative of the present invention accelerates degradation through rapid oxidation. The unique process of using and applying the present invention predictably breaks down long molecular chains into short ones that may be consumed by bio-organisms. Adaptation of existing manufacturing processes is seamless with few, if any, machine or process modifications required.

Unlike the cadmium based salts and their unpredictable outcomes, the present invention uses a cobalt salt and process that produces the desired "time bomb" predictability every time, and in every product, in which it is used. The unique blending and application process of the present invention may be reliably adjusted according to needs. For example, one product may be best suited to have a degradable life of one year or less, such as a plastic disposable film product, whereas another product may be best suited with a ten year lifespan, such as a toy used by children outdoors.

This unique process of the present invention is based on a predetermined mixture for the desired outcome (PMDO), which is based on an algorithm. The PMDO determines the amount of cobalt salt to be added to a pre-mixed batch (PMB). Instead of a life cycle analysis being a supposed means to determine degradability as used by traditional cadmium salts, the present invention uses a life stage analysis. As known in the art, the unpredictable results of cadmium salt based additives produce unpredictable life cycle analyses. In contrast, the present invention uses an analysis based on life stages using a predetermined algorithm (LSPA). Once determined, a mixed ratio of the reagent of the present invention is produced.

The LSPA approach requires understanding the primary uses, secondary uses, and recovery patterns of materials. For example, a plastic t-shirt bag after production is typically stored in a warehouse, next stored at a retailer, and then in its primary use when a customer carries home purchased goods. The bag will typically be used as a garbage bag in its secondary use, and under certain circumstances, a very small percentage of bags may be recovered by recycling operations. The algorithm is a method to determine the shortest reasonable time for degradation based on the intersections of the bell curve patterns of these three uses. The proper amount of reagent is then blended into a pre-mixed reagent batch (PMB) such that it is subsequently mixed into a master batch at a 10% ratio and; thus consistently provides the desired degradation cycle time throughout all products and, consistently throughout the plastic composition of each product.

More important is that regardless of the predetermined life of a plastic product to be manufactured, the PMB reagent of the present invention is always mixed at the same rate. Ideally, this rate is 10%, which provides easy, verifiable results with consistent outcomes. The PMDO will be essentially the same from master batch to master batch, from product to product. This is due to the desired LSPA of the 10% mixture of the reagent of the present invention.

Even more important, while the PMB reagent of the present invention is added to common ethylene resins at a 10% rate, which is substantially higher than the 1%-2% rate required by Cadmium salts, the overall cost of the present invention is substantially less. Thus, virtually all plastic products may be made degradable, and commercially viable, with minimum extra costs.

In addition to the previous benefits of the present invention, it also provides a significantly safer additive. Cadmium salts contain a high rate of impurities not found in cobalt. Cadmium in the water supply may be extremely harmful and has been associated with brain and neurological damage. Thus cadmium salt usage is banned in several countries as a hazardous sustainer (ROHS). On the other hand, the present invention is substantially safer as an organism will only absorb what it needs when exposed to the cobalt salt (typically via digestion). Likewise, it is significantly safer in the water supply promoting degradability of plastic articles accidentally disposed in lakes, rivers, oceans, and so on.

The present invention with its low cost, reliable PMDO and consistent LSPA, provides a means to incorporate a verifiable system of monitoring the production and manufacture of plastic products worldwide. This system is similar to that employed by the Forestry Stewardship Council (FSC)

in the paper industry. The FSC monitors all aspects of manufacture of paper products from forests that are qualified and managed under the system through to its delivery to the retailers in a chain of contracted parties.

Last, the present invention and processes may be effectively used in any number of plastic products and resin types. For example, polyethylene film products, molded products and extrusions, polystyrene foam products, and any number of plastics such as polypropylene, PET, ABS, and so on.

The objectives of the present invention are to provide:
1) A reagent that induces degradability.
2) A reagent that provides consistent degradable outcomes.
3) A reagent that minimizes toxic reactions.
4) A process for mixing a reagent to provide predetermined results.
5) A reagent that applies a predetermined algorithm.
6) An algorithm that dictates predetermined degradability outcomes.
7) A PMDO based on a desired algorithm.
8) A PMB based on a desired PMDO.
9) A system of adding a reagent to a master batch.
10) A system of adding a reagent to the master batch with predictable results.
11) A process that produces consistent LSPA outcomes.
12) A process of verifying the degradability outcomes.
13) A process of verifying LSPA.
14) A process of verifying the manufacture of a degradable reagent, and its blending in a master batch.

Furthermore, it is an object of this application to illustrate the preferred formulae, processes and systems, and broadly state the percentages that may be used in order to produce a reagent of the present invention and its associated products.

DETAILED DESCRIPTION

A. Description of the Preferred Embodiment(s)

Figure 1:
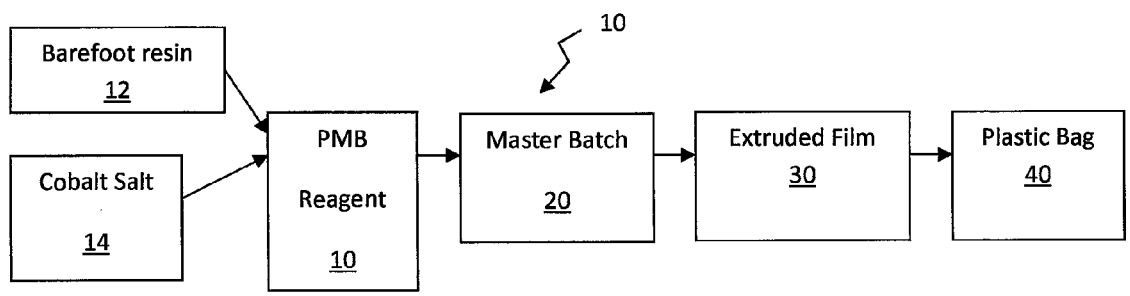
FIG. 1 is a flow chart of the present invention illustrating the sequence of adding to a master batch and a manufacturing product.

In Table 1 of the present invention, three variations on degradability are shown representing three typical plastic products and their desired degradability. Batches 1, 2, and 3 are pre-mixed batches consisting of a typical barefoot polyethylene resin and Cobalt salt. These pre-mixed batches (PMB) represent three variations of the reagents of the present invention. Each batch 1, 2, and 3 are essentially time bombs that will trigger degradability when mixed into their respective master batches, which in turn, each master batch is extruded, molded, or converted into a plastic product.

In Table 1, the PMB reagent 1 of the present invention is added at a 10% rate to the master batch and triggers a desired degradable effect for a HDPE plastic grocery sack to degrade in 2 years. Typically a disposable product such as a plastic sack, a Styrofoam container, or polyethylene glove is discarded into the trash, whereas a relatively short-term degradability is desired. This short term degradability is also desired when a disposable item is vulnerable to being discarded as litter. The PMB reagent 2 of the present invention is also added at a 10% rate to its master batch, and triggers its desired degradability in 4 years, which reflects the PMDO and LSPA of a styrene lunch box. This longer term is typical for products such as durable plastic toys and patio furniture which may be used for a longer duration prior to being discarded. The PMB reagent 3 of the present invention provides a substantially short term degradable effect as would be desired for items such as agricultural films, and so on. Like the others, it is also admixed at a 10% rate into its master batch.

TABLE 1

| PMB reagent # | Product Description: | Desired Degradability |
|---|---|---|
| 1. | Plastic Grocery Sack | 2 years |
| 2. | Expanded Styrene (foam) Lunch Box | 4 years |
| 3. | Agricultural Film Barriers | 1 growing season |

The PMB reagents of the present invention may be pre-mixed to accommodate virtually any desired term of degradability from 6 months up to 4 years. In all instances of the use of the reagent of the present invention, the PMB is clearly marked with the degradable time-bomb effect (TBE). Thus each batch of PMB has a pre-determined, verifiable degradable effect. The amount of cobalt salts measured in a PMB is in parts per million in order to achieve the PMDO, and the desired effect. Variation in these amounts, since they are quite small, will greatly affect the degradation time. Hence the methodology to control these percentages is critical for accurate degradation control.

A unique aspect of the reagents of the present invention is that all PMBs are ideally mixed with the master batch at a 10% rate. Regardless of the desired time-bomb effect (TBE) to trigger degradability, for example 1 year, 2 years, or even 8 years or more, the PMB of the present invention is mixed into a master batch at the 10% rate. Thus, pre-blending cobalt salts into a larger PMB, which batch is admixed into the master batch at a 10% rate—instead of the 1%-2% rate of cadmium salts—results in an amalgamous mixture in the master batch that provides consistent degradability, product after product, and evenly throughout each individual product. This unique methodology not only provides consistent results, but is cost effective, and establishes a means of verification throughout industries.

B. Description of an Exemplary Process of Pre-Mixing and Manufacturing

In FIG. 1, the PMB reagent of the present reagent invention 10 is manufactured by blending barefoot resin 12 with cobalt salt 14. The percentage of the cobalt salt 14 blended with the resin 12 has a predetermined PMDO and LSPA and thus determines the degradability time bomb effect when PMB reagent 10 is added to the master batch resin 20 at a 10% rate. Master batch 20 may then be extruded into a typical film 30, which film is then converted into a plastic bag 40. A typical amount of cobalt salt to be added to a PMB would be a few parts per million of the PMB in order to be added at a 10% rate to the master batch, and produce a degradation TBE of 2 years.

When plastic bag 40 is disposed, for example in a landfill, degradability is triggered through the introduction of moisture and air, and the plastic film becomes consumed by bio-organisms. The variation of the time bomb effect of a product manufactured using the PMB of the present invention 10 is pre-determined by the PMDO and LSPA. The only requirement for consistency in the manufacture of degradable products is to blend the PMB of the present invention at a 10% rate into the master batch.

The pre-blending process of adding a cobalt salt to a barefoot resin not only produces consistent results, but substantially reduces costs. The following Table 2 illustrates the cost of blending the PMB of the present invention (the PMB of Blend 2 in Table 1, illustrated in its trademark name "Oxium®") at its 10% rate, to the cost of one competitor at its 2% rate of oxodegradable using calcium salts (Blend 1), and a second competitor using no degradable additive.

TABLE 2

Blended Cost Calculator and Comparison:

| Cost/MT | Material | Rate: |
|---|---|---|
| Standard Production Batch | | |
| $1,500.00 | USD/MT, Base Material | 85.00%[1] |
| $2,500.00 | Additive 1: Pigment | 5.00% |
| $700.00 | Additive 2: Calcium Blend | 10.00% |
| $0.00 | Additive 3: TBD | 0.00% |
| $0.00 | No additive | 0.00% |
| $1,470.00 | Cost/MT at Machine | 100.00% |
| Blend 1: Other Oxo Agent with calcium reagent | | |
| $1,500.00 | USD/MT, Base Material | 83.00%[1] |
| $2,500.00 | Additive 1: Pigment | 5.00% |
| $700.00 | Additive 2: Calcium Blend | 10.00% |
| $0.00 | Additive 3: TBD | 0.00% |
| $11,000.00 | Additive 4: Oxo-degradable | 2.00%[2] |
| $1,660.00 | Cost/MT at Machine | 100.00% |
| $1,470.00 | Blend Cost without Oxo agent | |
| $190.00 | Cost Δ/MT | |
| 11.45% | Cost Δ as percent | |
| Annual Use in MT, Blended Resin at Machines: | | |
| 500 | Monthly Throughput, MT | |
| 6,000 | Annual Throughput, MT | |
| $1,095,000 | Annual Cost Δ Other Oxo Agent vs Oxium: | |
| | Cost Savings by Switching to Oxium | |
| Blend 2: Oxium | | |
| $1,500.00 | USD/MT, Base Material | 75.00%[1] |
| $2,500.00 | Additive 1: Pigment | 5.00% |
| $700.00 | Additive 2: Calcium Blend | 10.00% |
| $0.00 | Additive 3: TBD | 0.00% |
| $1,575.00 | Additive 4: Oxium | 10.00%[3] |
| $1,477.50 | Cost/MT at Machine | 100.00% |
| $1,470.00 | Blend Cost without Oxo agent | |
| $7.50 | Cost Δ/MT | |
| 0.51% | Cost Δ as percent | |

Notes:
[1]The percent of the base material is calculated automatically based on the additive percentages
[2]The rate of 2% is the standard "effective" blend to achieve results of approximately the same results as Oxium at 10%
[3]The Oxium additive is custom designed per intended use and is mixed at a lower concentration to increase mix ratio accuracy in blends Blends 1 and 2 are rated with a TBE at two (2) years, whereas the Standard Production Batch may take up to 1000 years. All three also use a "calcium blend" of 10%, which is unrelated to degradability and is commonly used by plastics manufacturers to increase production output. The significant cost savings in Table 2 provides a manufacturer with the means to improve profitability or lower its sales price and provide significant, consistently, high quality degradable performances. Perhaps more important is that Blend 2 may be effectively verified with a Chain of Custody verification system.

As illustrated in Table 2 the cost of Oxium as it is used in production facilities is significantly lower as a percentage and as an annual cost. Although the relative ratio is much higher (10% vs. 1%-2%) the blended cost of the PMB is much lower than the competitors' costs of oxodegradables using cadmium salts, thus allowing rapid oxidation of the present invention by plastics converters.

C. Description of an Exemplary Verification Process

Figure 2:
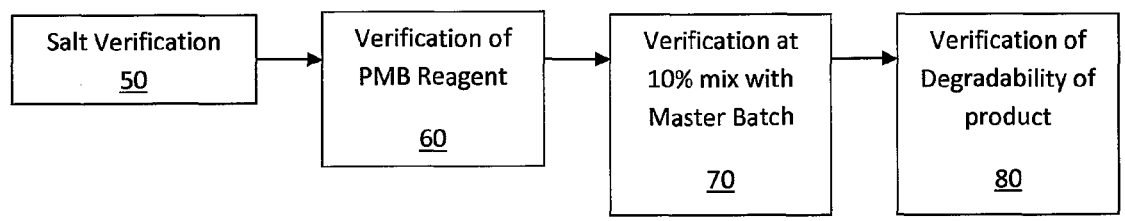
FIG. 2 is a flow chart illustrating a Chain of Custody process.

In FIG. 2 a verification process utilizes a similar "Chain of Custody" (COC) approach employed by the paper industry in North America. It begins with verification of the quality of cobalt salt 50, which salt 50 is pre-mixed at the desired rate with a plastic resin to produce PMB reagent and verification 60, then verification at a manufacturing facility 70 verifies that the PMB reagent is added to the master batch at a 10% rate. Last, the manufactured product 80 is tested to verify the desired degradation rate has been achieved.

This COC approach to verifying degradable properties in plastic products ensures consistent verifiable results by third parties. It produces a tracking system of accountability that pinpoints errors or intentional shaving of percentages to reduce costs. As previously illustrated in Table 2, an attempt to reduce costs by reducing the percentage of the PMB reagent of the present invention is minimalized since the additional cost of the pre-mixed reagent is minimal, almost insignificant. Whereas the shaving of percentages of use of calcium salt oxodegradables is enticing, if not prevalent.

D. Variations

The spirit of the present invention provides a breadth of scope that includes all methods of making and using it. For example, the 10% mixing rate of the PMB into a master batch may be 15%, 20%, 5% or even 1% or 2%. However the desired rate is determined, the objective is to produce consistent, reliable outcomes. Any variation on the theme and methodology of accomplishing the same objectives that are not described herein would be considered under the scope of the present invention.

What is claimed is:

1. A method of preparing a master batch of synthetic resin with a predetermined desired outcome that results in accelerated degradation of the synthetic resin comprising:
   determining a lifespan of a product to be made from the master batch;
   producing a mixture ratio of a compatible degradation inducing salt with a first compatible resin based on a predetermined algorithm;
   pre-mixing the compatible degradation inducing salt with the first compatible resin to create a pre-mixed batch, and;
   adding the pre-mixed batch with a second compatible resin to create the master batch.

2. The method of claim 1 wherein:
   the compatible degradation inducing salt is a cobalt salt.

3. The method of claim 1 wherein:
   the mixture ratio with the compatible degradation inducing salt determines a life span of the synthetic resin of the master batch when mixed together.

4. The method of claim 1 wherein:
   the pre-mixed batch is pre-mixed in order to be blended with the master batch in a predetermined percentage for all life spans.

5. The method of claim 1 wherein:
   the master batch is used to manufacture a product with a predetermined life span.

6. The method of claim 1 wherein:
the premixing of the pre-mixed batch is verified to contain sufficient compatible degradation inducing salt to cause degradation in the desired life span.

7. The method of claim 1 wherein:
the compatible degradation salt is verified to contain sufficient degradation properties to cause degradation in the desired life span.

8. The method of claim 1 wherein:
the master batch is verified to contain a correct percentage of the pre-mixed batch in order to cause one or more products manufactured from the master batch to degrade based on the predetermined life span.

9. A process of blending a plurality of synthetic resins with at least one compatible salt so that a product manufactured thereof contains properties that accelerate degradation of the product, comprising:
determining a lifespan of the product to be made from the blending of the plurality of synthetic resins;
mixing a compatible cobalt salt with a first synthetic resin based on a predetermined algorithm to produce a pre-mixed batch;
creating the pre-mixed batch so that the pre-mixed batch may be added to a second synthetic resin in a predetermined ratio;
blending the pre-mixed batch with the second synthetic resin, and;
manufacturing one or more products from the second synthetic resin.

10. The process of claim 9 wherein:
the percentage of the pre-mixed batch to be added with the second synthetic resin is always the same percentage regardless of the lifespan of the one more products made from the resultant blending of the pre-mixed batch with the second synthetic resin.

11. The process of claim 9 wherein:
the pre-mixed batch is verified to contain sufficient cobalt salt to cause degradation in the desired lifespan.

12. The process of claim 9 wherein:
the cobalt salt is verified to contain sufficient degradation properties to cause degradation in the desired lifespan.

13. The process of claim 9 wherein:
the blending of the pre-mixed batch with the second synthetic resin is verified to contain the correct percentage of the pre-mixed batch.

14. A method for predetermining an amount of degradation inducing salt to be added to a synthetic resin in order to cause a product made from a blend of the synthetic resin and the degradation inducing salt to degrade with a predetermined lifespan comprising:
selecting a product to be made using a blend of one or more synthetic resins and the degradation inducing salt;
selecting a predetermined lifespan for the product;
based on the predetermined lifespan, determining a proper mixing ratio of the degradation inducing salt to the synthetic resin by referring to a mixture algorithm; and
using the mixing algorithm to create a pre-mixed batch that will be added to a second synthetic resin, which when combined cause the selected product made from the combination of the pre-mixed batch and the second synthetic resin to degrade in accordance with the selected predetermined lifespan, the mixing algorithm taking into account a primary use and a secondary use of the product and a recovery pattern of a set of base materials making up the product.

* * * * *